United States Patent
June et al.

(10) Patent No.: US 8,463,922 B2
(45) Date of Patent: Jun. 11, 2013

(54) METHOD FOR STORING CREDENTIALS IN A J2EE CONNECTOR ARCHITECTURE

(75) Inventors: Deborah C. June, Groton, MA (US); Brian Chesebro, Londonderry, NH (US)

(73) Assignee: Oracle International Corporation, Redwood Shores, CA (US)

( * ) Notice: Subject to any disclaimer, the term of this patent is extended or adjusted under 35 U.S.C. 154(b) by 392 days.

(21) Appl. No.: 12/030,660

(22) Filed: Feb. 13, 2008

(65) Prior Publication Data

US 2009/0043892 A1 Feb. 12, 2009

Related U.S. Application Data

(62) Division of application No. 10/248,744, filed on Feb. 13, 2003.

(60) Provisional application No. 60/406,745, filed on Aug. 29, 2002.

(51) Int. Cl.
  *G06F 15/16* (2006.01)
  *G06F 15/173* (2006.01)
  *H04L 29/08* (2006.01)
  *H04L 29/06* (2006.01)

(52) U.S. Cl.
  CPC .......... *H04L 29/08072* (2013.01); *H04L 29/06* (2013.01)
  USPC .......... 709/229; 709/203; 709/217; 709/225; 709/226; 709/227; 709/228

(58) Field of Classification Search
  USPC .................. 709/203, 224–229, 217
  See application file for complete search history.

(56) References Cited

U.S. PATENT DOCUMENTS

| | | | | |
|---|---|---|---|---|
| 5,586,260 | A | * 12/1996 | Hu | 726/12 |
| 5,751,967 | A | 5/1998 | Raab et al. | |
| 6,182,109 | B1 * | 1/2001 | Sharma et al. | 718/104 |
| 6,721,777 | B1 | 4/2004 | Sharma | |
| 6,766,324 | B2 * | 7/2004 | Carlson et al. | 707/10 |
| 6,854,120 | B1 | 2/2005 | Lo et al. | |
| 7,089,584 | B1 * | 8/2006 | Sharma | 726/4 |
| 7,100,195 | B1 * | 8/2006 | Underwood | 726/2 |
| 7,203,756 | B2 | 4/2007 | Tapperson | |
| 7,454,492 | B2 | 11/2008 | Bauer et al. | |

(Continued)

OTHER PUBLICATIONS

Ajaz Rana and Albie Collins: "Java Juction", Apr. 2001, pp. 1-9, Intelligent Enterprise.*

(Continued)

*Primary Examiner* — Catherine Thiaw
(74) *Attorney, Agent, or Firm* — Fliesler Meyer LLP

(57) ABSTRACT

A connector architecture implementation that is J2EE compliant and provides improved connection management capabilities. The connector architecture implementation provides a connector leak detection mechanism that detects connection leaks both automatically and manually. The connector architecture implementation pre-configures and manages the growth and reduction of a connection pool. The connector architecture implementation may be pre-configured by pre-populating the connection pool. Connection pool growth may be managed by generating connections in response to connection requests. A connection pool may also be configured to reduce the number of connections in the pool. The number of connections may be reduced if the connection demand decreases. Password credentials allowing access to services are used to provide additional connection management.

12 Claims, 7 Drawing Sheets

U.S. PATENT DOCUMENTS

| | | | |
|---|---|---|---|
| 7,484,224 B2 | 1/2009 | Potter et al. | |
| 7,490,334 B2 * | 2/2009 | Shapiro et al. | 719/328 |
| 7,506,342 B2 * | 3/2009 | Mousseau et al. | 719/320 |
| 7,546,606 B2 * | 6/2009 | Upton | 719/318 |
| 2002/0010781 A1 * | 1/2002 | Tuatini | 709/227 |
| 2002/0116455 A1 * | 8/2002 | Mitchell et al. | 709/203 |
| 2002/0161860 A1 | 10/2002 | Godlin et al. | |
| 2003/0018832 A1 * | 1/2003 | Amirisetty et al. | 709/328 |
| 2003/0037181 A1 | 2/2003 | Freed | |
| 2003/0182426 A1 * | 9/2003 | Hapner et al. | 709/226 |
| 2003/0195997 A1 * | 10/2003 | Ibert et al. | 709/318 |
| 2003/0212987 A1 * | 11/2003 | Demuth et al. | 717/130 |
| 2004/0010631 A1 * | 1/2004 | Potter et al. | 709/250 |
| 2005/0223392 A1 * | 10/2005 | Cox et al. | 719/328 |
| 2006/0080435 A1 | 4/2006 | Tankov et al. | |
| 2008/0270600 A1 | 10/2008 | Tankov et al. | |

OTHER PUBLICATIONS

Bea Ssytems WebLogic Server 6.1, "Connection Management", 2001, p. 1-3 http://e-docs.bea.com/wls/docs61/jconnector/connect.html.*

Marinescu, "BEA Weblogic Server 6.1 has been Released", Jul. 31, 2001, 1 page, The ServerSide.com.

Bea Systems, Inc., "About this Document", Sep. 19, 2001, 4 pages, WebLogic Server 6.1.

Bea Systems, Inc., "BEA Weblogic Server-Programming WebLogic J2EE Connectors", Aug. 20, 2002, pp. 1-119, Release 7.0, BEA Systems, Inc.

Bea Systems, Inc., "BEA WebLogic Server 6.1", Jun. 24, 2002, pp. 1-113, BEA Systems, Inc.

Youngs et al., Enterprise Integration With IBM Connectors and Adapters, Feb. 2002, pp. 1-240.

* cited by examiner

METHOD FOR STORING CREDENTIALS IN A J2EE CONNECTOR ARCHITECTURE

CLAIM OF PRIORITY

This application is a divisional of pending U.S. patent application Ser. No. 10/248,744 entitled "J2EE CONNECTOR ARCHITECTURE," by Deborah C. June, et al., filed Feb. 13, 2003, which claims the benefit of U.S. Provisional Patent Application No. 60/406,745 filed Aug. 29, 2002, which applications are incorporated herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCED APPLICATIONS

The current application hereby incorporates by reference the material in the following patent applications:

U.S. patent Application No. 60/354,738, entitled "J2EE COMPONENT EXTENSION ARCHITECTURE," filed Feb. 6, 2002; and U.S. Patent Application No. 60/397,916, entitled "SYSTEM AND METHOD FOR IMPLEMENTING J2EE CONNECTOR ARCHITECTURE," filed Jul. 23, 2002.

FIELD OF THE INVENTION

The current invention relates generally to connector architectures, and more particularly to a method for storing credentials in a J2EE connector architecture.

BACKGROUND OF THE INVENTION

The Java™ 2 Platform, Enterprise Edition (J2EE), from Sun Microsystems, Inc. of Palo Alto, Calif., defines a standard for developing multi-tier enterprise applications. A J2EE Connector Architecture is useful for the integration of J2EE-compliant application servers with at least one enterprise information system (EIS). There are typically two parts to this architecture: an EIS vendor-provided resource adapter and an application server to which the resource adapter plugs in. The J2EE Connector Architecture also defines a common client interface (CCI) that can be used to access an EIS. A CCI defines a client API for interacting with heterogeneous EIS systems, which enables application components and Enterprise Application Integration (EAI) frameworks to drive interactions across heterogeneous EIS systems using a common client API.

A resource adapter is a segment of code that represents an Enterprise Information System (EIS). More specifically, a resource adaptor is a system-level software driver used by an application server such as WebLogic Server is used to connect to an enterprise information system (EIS). A resource adapter serves as the "J2EE connector." The connector architecture implementation supports resource adapters developed by EIS vendors and third-party application developers that can be deployed in any application server supporting the Sun Microsystems J2EE Platform Specification, Version 1.3. Resource adapters contain the Java, and if necessary, the native components required to interact with the EIS.

J2EE Connector Architecture is an architecture for integrating J2EE-compliant application servers with enterprise information systems (EIS). There are two parts to this architecture: an EIS vendor-provided resource adapter and an application server, such as WebLogic Server, by BEA Systems of San Jose, Calif., to which the resource adapter plugs in. This architecture defines a set of contracts, such as transactions, security, and connection management, that both the resource adapter and application server need to support to communicate with one another. The J2EE Connector Architecture also defines a Common Client Interface (CCI) for EIS access. The CCI defines a client API for interacting with heterogeneous EIS's.

What is needed is an improved connector architecture implementation system that is more efficient and allows an administrator to monitor and make changes to connections within the application server as needed.

SUMMARY OF THE INVENTION

A connector architecture implementation is provided that includes advantageous features in connection management as well as other areas. In one embodiment of the present invention, connector leaks may be detected both automatically and manually. Connection pools for an EIS may be configured to more efficiently fulfill connection requests. In one embodiment, connection pools are pre-populated when the application server starts up. In another embodiment, connection pools that experience reduced usage are decreased in size. Managed connections may be recycled to fulfill connection requests. In another embodiment, managed connections may be monitored by an administrator. A user may monitor connections such as leaking connections and idle connections and delete connections as needed.

DETAILED DESCRIPTION

A connector architecture implementation is provided that is J2EE compliant and provides improved connection management capabilities. In one embodiment of the present invention, the connector architecture implementation provides a connector leak detection mechanism. The connector leak detector may detect connection leaks both automatically and manually. In another embodiment of the present invention, the connector architecture implementation is operable to pre-configure a connection pool and manage the growth and reduction of a connection pool. The connector architecture implementation may be pre-configured by pre-populating the connection pool. Connection pool growth may be managed by connections that are created in response to connection requests. A connection pool in the present invention may also be configured to reduce the number of connections in the pool. In one embodiment, the number of connections is reduced if the connection demand decreases. Password credentials allowing access to services are used to provide additional connection management.

Figure 1:
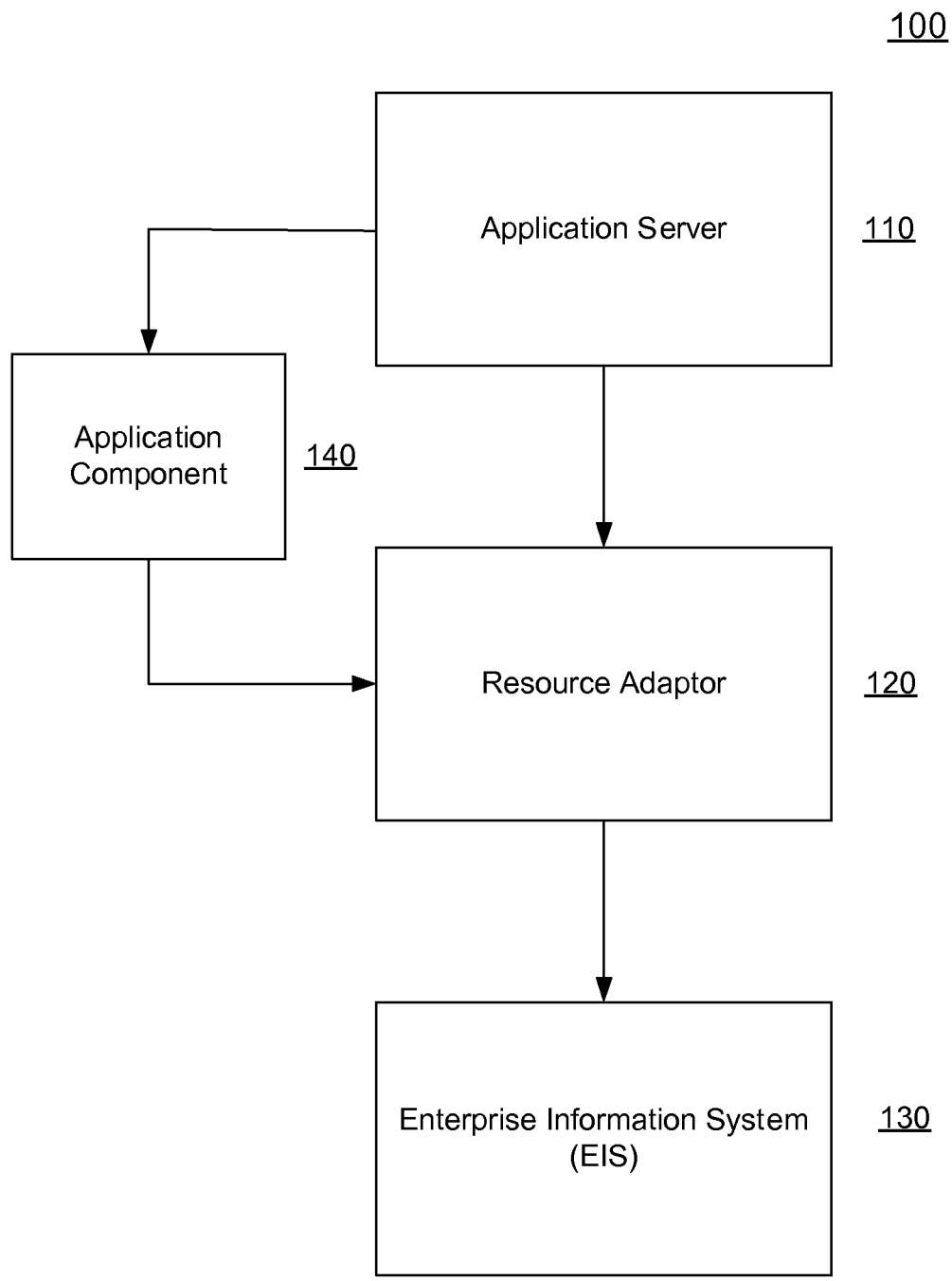
FIG. 1 is an illustration of a connector architecture in accordance with one embodiment of the present invention.

FIG. 1 is an illustration of a connector architecture implementation 100 in accordance with one embodiment of the present invention. Connector architecture implementation 100 includes application server 110, resource adapter 120, enterprise information system (EIS) 130, and application component 140. In one embodiment of the present invention, the connector architecture implementation is compatible with J2EE. The connector architecture implementation may be implemented in an application server and an EIS-specific resource adapter.

A resource adapter is a system level software driver used by an application server to connect to an EIS. A resource adapter may serve as a connector. Resource adapters contain the Java and any native components required for the application server to interact with the EIS. In one embodiment, the connector architecture of the present invention supports resource adapters developed by EIS vendors and third party application developers that can be deployed in any application server supporting the J2EE platform specification. An EIS provides the information infrastructure for an enterprise and offers a set of services to its clients. The services may be exposed to clients as local or remote interfaces, or both. An application component may be an EJB, JSP, or servlet that is deployed, managed, or executed on an application server.

The connector architecture implementation 100 of FIG. 1 further includes system level contracts. System level contracts exist between the resource adapter and the application server. The contracts may relate to connection management or other aspects of the connector architecture. Connection management contracts allow an application server the ability to provide a pool of connections to underlying EISs that enable application components to connect to an EIS. In one embodiment of the present invention, the connection management relates to connection pool configuration, connection pool management, and connection management.

In connector systems, multiple applications may attempt to establish a connection with the EIS. One connection pool holds all available managed connections to this EIS. Sometimes, after connecting to and using the services of an EIS, connector applications may not close the connection object. A connection object that is not closed after the application has completed using the connection object is considered a leaking connection.

Figure 2:
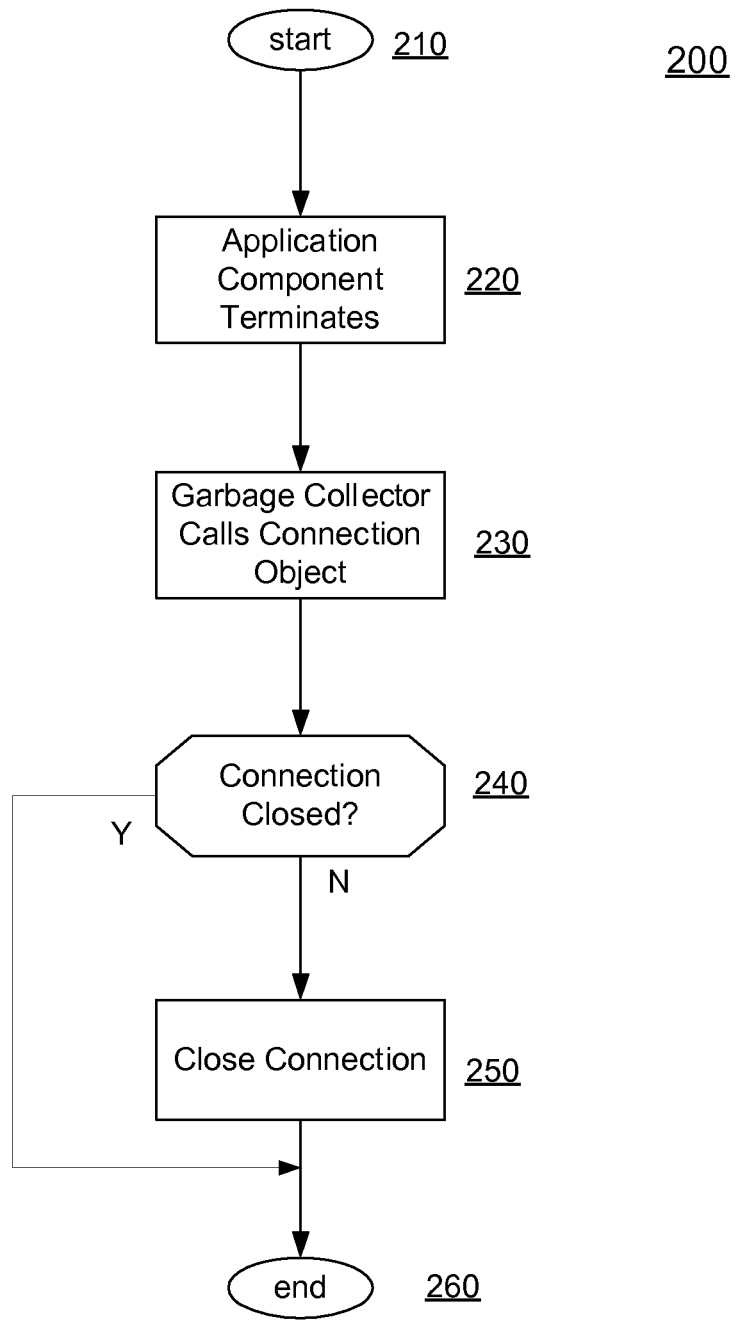
FIG. 2 is an illustration of a method for automatically detecting a connection leak in accordance with one embodiment of the present invention.

In one embodiment of the present invention, leak detection is performed automatically by leveraging the garbage collector. FIG. 2 illustrates a method 200 for detecting connection leaks automatically. Method 200 begins with start step 210. Next, an application component terminates in step 220. Once an application component terminates, the connection object used by the application component becomes de-referenced. After the application component terminates, the garbage collector calls a connection object in step 230. In one embodiment, the "finalize( )" method of a connection object is called by the garbage collector. Operation then continues to step 240. In one embodiment, the connector architecture implementation then determines if the application component closed the connection object at step 240. If the application component was determined to have closed the connection, or if the application server determines it is not safe to close the connection object, (for example, another application has a reference to the connection object), the method proceeds to end step 260. If the application component did not close the connection object and the application server confirms that it is safe, then the connection object is closed in step 250. In one embodiment, the server automatically closes the connection object in step 250. The server may close the connection object by calling the resource adapter's "ManagedConnection.cleanup( )" method. The application server then operates as it would have if it received a "ConnectionClosed" event upon a proper closure of the application component connection. After closing the connection object in step 250, the method ends in step 260.

In some instances, a leak detection system in addition to the automatic leak detection system is desirable. For example, the garbage collector may not call the finalize( ) method of the connection object used by the faulty application component. In this situation, additional leak detection methods would be useful for establishing increased connection management efficiency.

Figure 3:
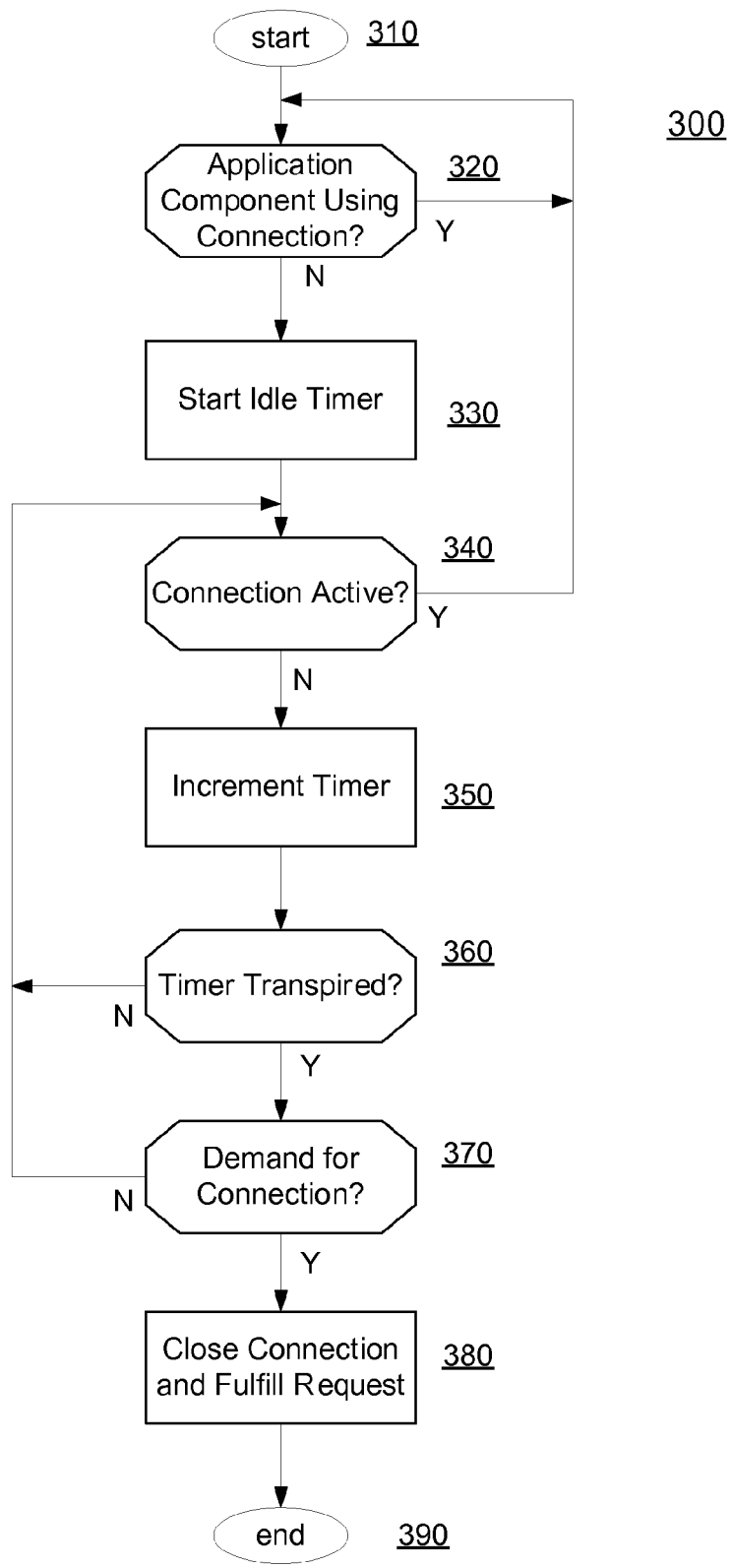
FIG. 3 is an illustration of a method for manually detecting a connection leak in accordance with one embodiment of the present invention.

The connector architecture implementation of the present invention also provides for a manual leak detection mechanism. The manual leak detection mechanism may be advantageous in detecting leaks when the garbage collector is unreliable and in the case of multiple connection object references. A method 300 for manual leak detection performed within the connector architecture of the present invention is shown in FIG. 3. Method 300 begins with start step 310. Next, in step 320 the connector architecture implementation determines whether the application component is actively using the connection it has requested. An active connection is a connection wherein an application component is currently using a requested connection object by calling methods on it or calling a request for a connection object request. If the application component connection is determined to be active, then operation returns to step 320. If an application component connection is determined to be inactive, operation continues to step 330. In step 330, a mechanism is triggered to monitor the time an application component connection is inactive. In one embodiment, the mechanism is a timer. The timer measures the last time a particular connection was active. In one embodiment, a timer may be configured to transpire in seconds for each connection associated with an EIS. In step 340, if an inactive connection becomes active while the timer transpires, operation continues to step 320. While the connection remains inactive, operation continues to step 350 and the timer continues to transpire. In step 360, it is determined whether or not the timer has reached a particular value. In one embodiment, the particular value is configured as a maximum idle time parameter. The maximum idle time parameter is a period of time in which after it has elapsed, the connection is considered expired. If the value of the timer is less then the maximum idle time parameter in step 360, operation continues to step 340. If the value of the timer has reached the maximum idle time parameter, then operation continues to step 370. In step 370, the connector architecture implementation determines if there is a demand for a managed connection. In one embodiment, a demand for a managed connection exists if the connection pool has reached a maximum capacity of managed connections and the connector architecture implementation receives a managed connection request. If either no connection request has been made or a connection request has been made but the connection pool may fulfill the request, then operation regarding the particular connection object request continues to step 340. If the connection pool has no available allocated connections and a connection request is made, operation continues to step 380. In step 380, the connector architecture implementation closes the connection object associated with the timer that has exceeded the maximum idle time parameter. The managed connection is now available to service connection requests. Operation of the manual leak detection system then ends in step 390.

Figure 4:
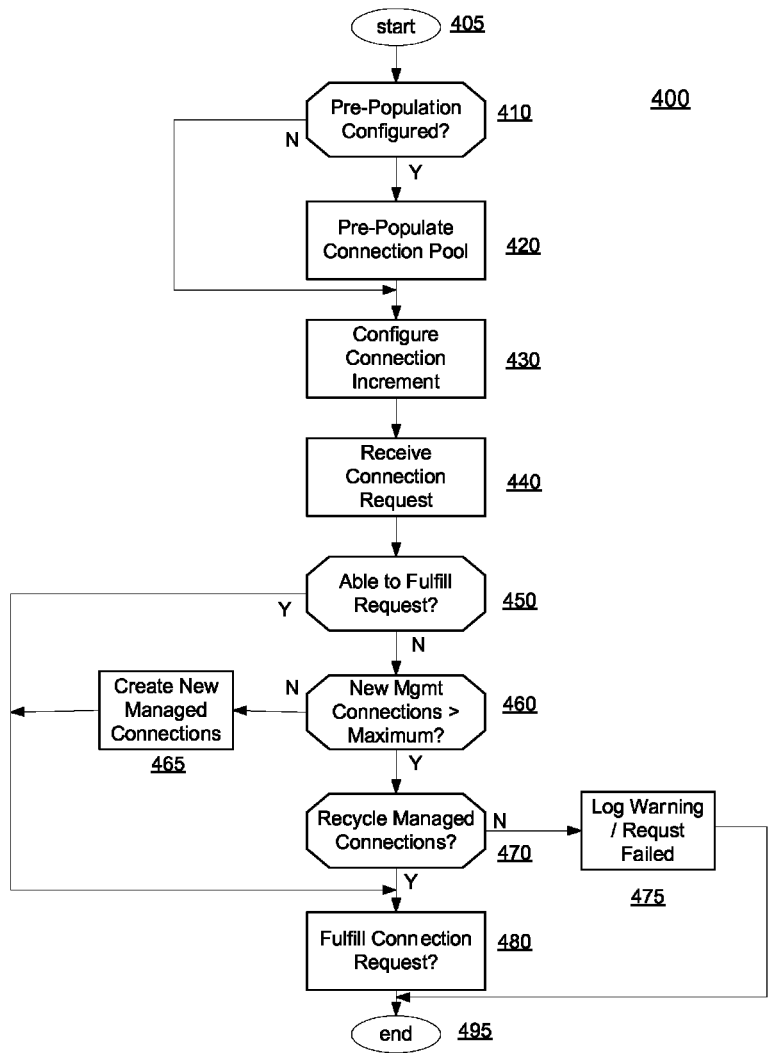
FIG. 4 is an illustration of a method for configuring a connection pool in accordance with one embodiment of the present invention.

In addition to detecting connection leaks, the connector architecture implementation of the present invention may configure a connection pool for an EIS to aid in fulfilling connection requests. In one embodiment, the connection pool can be configured for pre-population. Pre-populating the connection pool with an initial number of managed connections is done upon startup of the application server and connector architecture implementation of the present invention. This pre-population prevents experiencing a decrease in performance when the managed connections are later created upon request. FIG. 4 illustrates a method 400 for configuring a connection pool in accordance with one embodiment of the present invention. Method 400 begins with start step 405. Next, the connector architecture implementation of the present invention determines whether or not an EIS is configured in such a manner as to pre-populate the connection pool associated with the EIS with an initial number of managed connections. If the connection pool is not to be pre-populated, then operation continues to step 430. If pre-population is to occur, then operation continues to step 420. In step 420, the connection pool is populated with managed connections. In one embodiment, the number of managed connections used to pre-populate a connection pool may be configured by a pre-population parameter. The parameter is specific to a particular connection pool associated with the resource adapter. In one embodiment of the present invention, the pre-population parameter is an initial-capacity element, located in an XML formatted descriptor file of the connector architecture implementation of the present invention. The initial capacity element specifies how many managed connections a connection pool should be pre-populated with at the deployment of a resource adapter with the application server. In one embodiment of the present invention, pre-population of managed connections may not be done where runtime parameters are required.

A connection increment parameter is then configured in step 430. The connection increment parameter represents the number of managed connections that are created at the time a connection request is made. The connection increment parameter allows a user to control the connection pool growth and when to incur the performance and processing costs of connection pool growth. In one embodiment, the connection increment parameter is a capacity-increment element located in an XML formatted descriptor file of the connector architecture implementation of the present invention.

A connection request is then received in step 440. In one embodiment, a connection request may involve an application component requesting a connection object to an EIS through the resource adapter. Once a connection request is received, the connector architecture implementation determines whether the request may be fulfilled with existing available managed connections in step 450. If the connection request can be fulfilled, then operation continues to step 480. If the connection request can not be fulfilled with existing and available managed connections, the operation continues to step 460.

In step 460, it is determined whether creating a new managed connection will exceed a maximum allowed number of managed connections. In one embodiment, the maximum number of allowed connections is determined by a maximum-capacity element located in an XML formatted descriptor file of the connector architecture implementation of the present invention. The maximum number of managed connections may be configured for a single EIS. In one embodiment, more than one managed connection may be created when a connection request is received and no available managed connections exist. In particular, the number of managed connections created may correspond to the capacity-increment parameter. Thus, if the connection increment parameter has a value of three, then the connector architecture implementation will attempt to add three managed connections if a connection request can not be fulfilled by existing and available managed connections. In any case, if adding managed connections in the amount of the connection increment parameter does not bring the number of managed connections associated with an EIS over the maximum managed connections allowed for that EIS, then operation continues to step 465 where the new managed connections are created within the connection pool. If adding the new managed connections does bring the number of managed connections over the maximum allowed for an EIS, then operation continues to step 470.

The connection architecture implementation determines whether or not managed connections can be recycled in step 470. In one embodiment, recycling includes terminating connection objects that are determined to be inactive. The connector architecture implementation may determine a connection object is inactive according to the method 300 for manually detecting connection leaks as illustrated in FIG. 3 and discussed above. In particular, in step 370, if it is determined that the timer associated with a connection has transpired and a connection request is received in step 370, then the connection object will be closed in step 380 and recycled for use in step 470. If no connection objects exist that can be recycled, then operation continues to step 475 where a warning is logged and the connection request fails. If existing connection objects may be recycled to meet the connection request, the connection request is fulfilled in step 480. Operation then ends in step 495.

Figure 5:
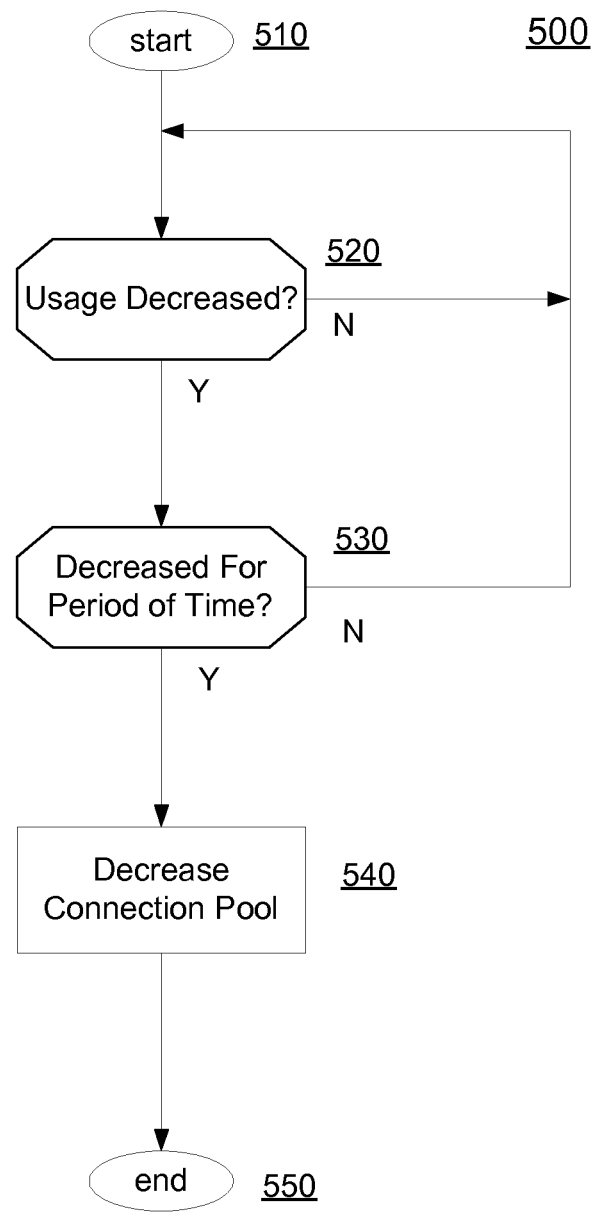
FIG. 5 is an illustration of a method for controlling connection pool shrinkage in accordance with one embodiment of the present invention.

In addition to managing the growth of a connection pool, the connector architecture implementation of the present invention can manage the reduction of the connection pool. In one embodiment of the present invention, the connector architecture implementation may monitor the managed connection usage and reduce the size of the connection pool if the usage has decreased. A method 500 for reducing the number of managed connections in accordance with one embodiment of the present invention is illustrated in FIG. 5. Method 500 begins with start step 510. Next, the connector architecture implementation of the present invention determines whether managed connection usage has decreased in step 520. If the managed connection usage has decreased through the use of fewer managed connections or in some other manner, then operation continues to step 530. If the managed connection usage has not decreased, then operation returns to step 520. In step 530, the connector architecture implementation determines if the managed connection usage decrease has existed for a specified period of time. In one embodiment of the present invention, the period of time may be configured as a parameter in the shrink-period-minutes element located in an XML formatted descriptor file of the connector architecture implementation. The period of time is associated with a single connection pool associated with the resource adapter. If the usage decrease has not existed for the specified period of time, then operation returns to step 520. If the usage decrease has existed for the specified period of time, operation continues to step 540. The size of the connection pool is decreased in step 540. In one embodiment, at least one managed connection is closed to reduce the size of the connection pool. The connector architecture implementation may close a number of managed connections to establish a number of managed connections to efficiently satisfy ongoing connection requests In one embodiment, connection object usage is monitored by taking "snapshots" of connection object usage at intervals of time, the snapshots triggered by a monitor timer. When shrinking is detected as a result of a comparison of the snapshots, or if the connector architecture determines shrinking should occur, the connection pool is reduced to the higher of the initial-capacity of the pool or the average usage level. In one embodiment, the method for reduction of the connection pool may be enabled or disabled by the user. In one embodiment, reduction of the connection pool may be enabled by configuring a shrinking-enabled element located in an XML formatted descriptor file of the connector architecture implementation.

Figure 6:
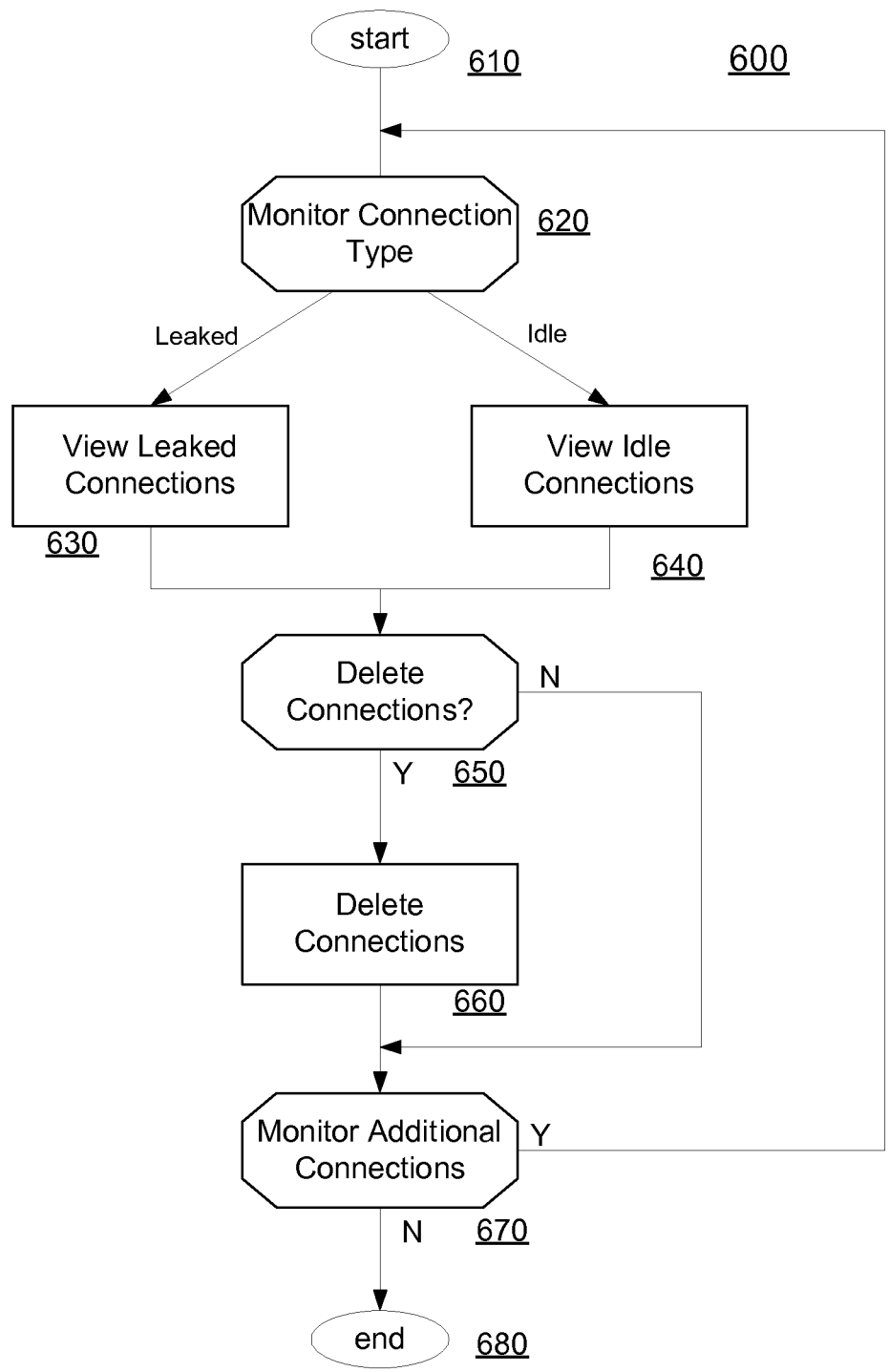
FIG. 6 is an illustration of a method for monitoring connections in accordance with one embodiment of the present invention.

The connector architecture implementation may also provide for monitoring of managed connections. In one embodiment of the present invention, a user may view and monitor managed connections. Types of managed connections to view and monitor may include leaked and idle connections. In one embodiment of the present invention, a connection-profiling-enabled element located in an XML formatted descriptor file of the connector architecture implementation indicates whether a connection pool should store the call stacks of where each connection is allocated. In one embodiment, if the connection-profiling-enabled element is configured to be true, the stacks for leaked, and idle connections can be viewed and a user may debug components that fail to close connection objects. A method 600 for monitoring of connections in accordance with one embodiment of the present invention is illustrated in FIG. 6. Method 600 begins with start step 610. Next, a user may choose between viewing information regarding and monitoring leaked connections and idle connections. If leaked connections are to be viewed, then operation continues to step 630. In step 630, a user may view information regarding leaked connections. The leaked connection information may be displayed through a console, a log window, or some other manner. The leaked connection information may include run time information of leaked connections, profile information. In one embodiment, profile information displayed includes dates from the call stack of the connection object usage. This data helps the administrator determine which application or application component caused the leak. If idle connections are to be viewed, then operation continues to step 640. In step 640, idle information such as profile information for idle connections may be viewed by a user. After viewing connection information in steps 630 or 640, a user may then decide to delete a connection object in step 650. In one embodiment, a leaked connection object may be deleted if the connection object has exceeded a specified idle time and is not involved in a transaction. If no connection is to be deleted, then operation continues to step 670. If a connection object is to be deleted, then operation continues to step 660 where the connection object is deleted. Next, operation continues to step 670 where a user may view more connections or end the monitoring of managed connections. If a user wishes to further monitor managed connections, operation continues to step 620. If no further monitoring of managed connections is to occur, operation ends at step 680.

Figure 7:
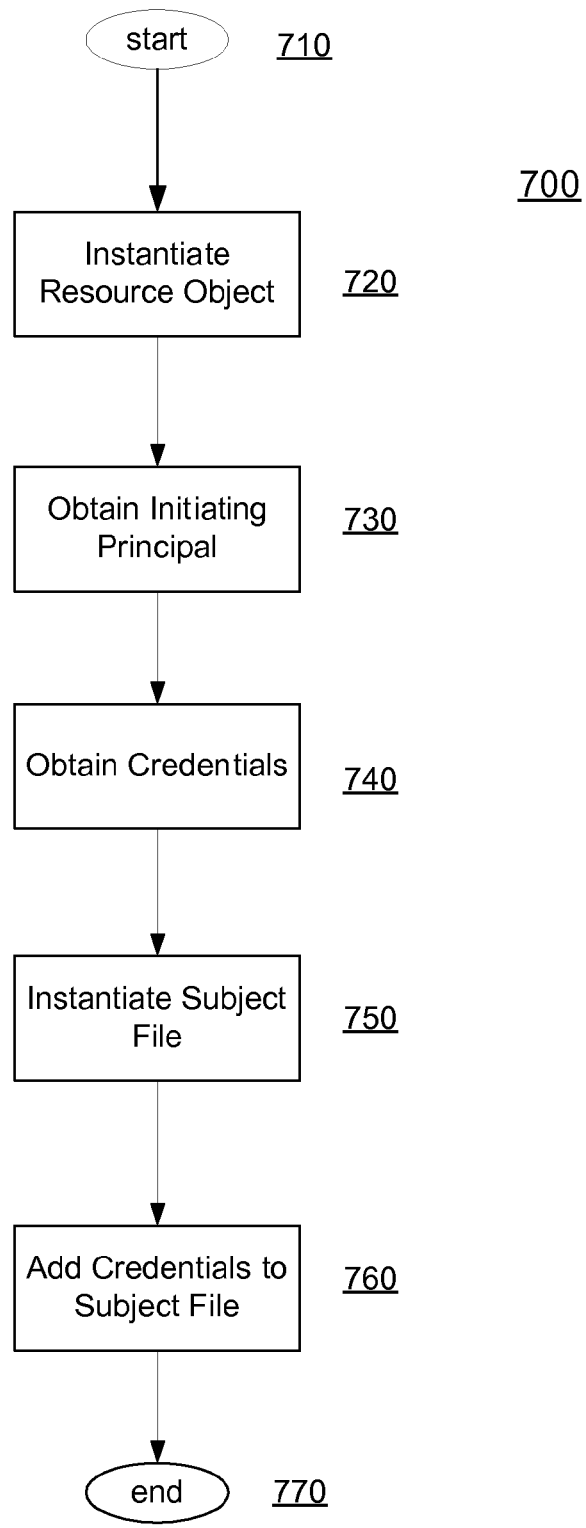
FIG. 7 is an illustration of a method for storing credentials in accordance with one embodiment of the present invention.

The connector architecture implementation provides security management. In one embodiment of the present invention, credentials are stored in a javax.security.auth.Subject object to comply with Sun's J2EE Connector Specification, version 1.0 final release. A method 700 for storing credentials in accordance with one embodiment of the present invention is shown in FIG. 7. Method 700 begins with start step 710. Next, an EIS resource object is instantiated in step 710. In one embodiment, a weblogic.security.Service.EISResource object is instantiated with the following command:

```
new EISResource(java.lang.String applicationName,
java.lang.String moduleName, java.lang.String eisName)
```

The command is executed from the security management code of the WebLogic Server. Next, the initiating principal for the connection request is obtained in step 730. In one embodiment, the initiating principal is obtained by querying the WebLogic Server security code for the user initiated principal associated with the application component making the connection request. Then, credentials for the initiating principal are obtained in step 740. In one embodiment, the credentials are obtained with the following command:

```
weblogic.security.Service.PrincipalAuthenticator(String
initiatingPrincipal,weblogic.security.Service.Resource
eisResource)
```

A Subject file is then instantiated in step 750. In one embodiment, the file is a javax.security.auth.Subject. Then, credentials are added to the subject file in step 760. In one embodiment, the credentials are added to the private set in the credentials with the following command:
Subject.getPrivateCredentials( ).add(Credential)
The Subject file is then completed and method 700 ends at step 770.

The connector architecture implementation of the present invention is provided that is J2EE compliant and provides improved connection management capabilities. In one embodiment of the present invention, the connector architecture implementation provides a connector leak detection mechanism. The connector leak detector may detect connection leaks both automatically and manually. In another embodiment of the present invention, the connector architecture implementation is operable to pre-configure a connection pool and manage the growth and reduction of a connection pool. The connector architecture may be pre-configured by pre-populating the connection pool. Connection pool growth may be managed by connections that are created in response to connection requests. A connection pool in the present invention may also be configured to reduce the number of connections in the pool. In one embodiment, the number of connections is reduced if the connection demand decreases. Password credentials allowing access to services are used to provide additional connection management.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art.

The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the methods of the present invention.

Included in the programming (software) of the general/specialized computer or microprocessor are software modules for implementing the teachings of the present invention, including, but not limited to, separating planes of a source image, averaging at least one of foreground and background colors, replacing colors, and compensating for error introduced by color replacement in one plane by feeding error into a second plane, storage, communication of results, and reconstructing an image according to the processes of the present invention.

Other features, aspects and objects of the invention can be obtained from a review of the figures and the claims. It is to be understood that other embodiments of the invention can be developed and fall within the spirit and scope of the invention and claims.

The foregoing description of embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

The invention claimed is:

1. A computer-implemented method to support a connector architecture comprising:
deploying at least one resource adapter in an application server to connect the application server with an enterprise information system;
initiating a connection pool at the application server, running on one or more microprocessors, to handle a connection request to the enterprise information system, wherein the connection pool is managed under a connection management contract between the application server and the resource adapter;
pre-populating the connection pool with an initial number of managed connection objects, wherein each said managed connection object is an application level entity that is adapted to connect an application component to the enterprise information system;
receiving a request for a connection to the enterprise information system from an application component on the application server;
instantiating a resource object in the application server for accessing the enterprise information system in response to the connection request;
obtaining an initiating principal associated with the application component making the connection request by querying security code of the application server;
obtaining credentials from the application server for the initiating principal; and handling the connection request to the enterprise information system with an existing managed connection object pre-populated in the connection pool after obtaining the credentials for the initiating principal;
allowing the connection pool to store call stacks of where each connection is located, in order to allow a user to debug an application component that fails to close connection objects.

2. The computer-implemented method of claim 1, further comprising:
integrating the application server with the enterprise information system.

3. The computer-implemented method of claim 1, further comprising:
instantiating a subject object;
associating the credentials to the subject object; and
associating the subject object with the resource object.

4. The computer-implemented method of claim 3, further comprising:
adding the credentials to a private set in the subject object.

5. The computer-implemented method of claim 3, further comprising:
allowing the subject object to be an instance of a security authentication subject class.

6. The computer-implemented method of claim 1, further comprising:
determining, based on the credentials in a subject object associated with the resource object, whether the connection request to the enterprise information system through the resource adapter can be fulfilled with an existing managed connection objects in the connection pool.

7. The computer-implemented method of claim 1, further comprising:
determining the initial number of managed connection objects based on an initial capacity element in a descriptor file that specifies how many managed connections the connection pool should be pre-populated with at the deployment of the at least one resource adapter.

8. The computer-implemented method of claim 1, further comprising:
deploying at least another one resource adapter to connect the application server with another enterprise information system;
initiating another connection pool at the application server to handle a connection request to the another enterprise information system, wherein the another connection pool is also managed under a connection management contract between the application server and the resource adapter; and
pre-populating the another connection pool with another initial number of managed connections.

9. The computer-implemented method of claim 1, further comprising:
using a garbage collector to recycle said managed connections automatically.

10. A non-transitory computer-readable storage medium, storing instructions to support a connector architecture, the instructions comprising:
deploying at least one resource adapter in an application server to connect the application server with an enterprise information system;
initiating a connection pool at the application server to handle a connection request to the enterprise information system, wherein the connection pool is managed under a connection management contract between the application server and the resource adapter;
pre-populating the connection pool with an initial number of managed connection objects, wherein each said managed connection object is an application level entity that is adapted to connect an application component to the enterprise information system;
receiving a request for a connection to the enterprise information system from an application component on the application server;
instantiating a resource object in the application server for accessing the enterprise information system in response to the connection request;
obtaining an initiating principal associated with the application component making the connection request by querying security code of the application server;
obtaining credentials from the application server for the initiating principal associated with the application component making the connection request; and
handling the connection request to the enterprise information system with an existing managed connection object pre-populated in the connection pool after obtaining the credentials for the initiating principal;
allowing the connection pool to store call stacks of where each connection is located, in order to allow a user to debug an application component that fails to close connection objects.

11. The non-transitory computer-readable storage medium of claim 10, wherein the connector architecture is an architecture for integrating the application server with enterprise information systems.

12. A system to support a connector architecture comprising:
one or more microprocessors;
an application server running on the one or more microprocessors, wherein the application server operates to
connect with an enterprise information system via at least one resource adapter; initiate a connection pool at the application server to handle a connection request to the enterprise information system, wherein the connection pool is managed under a connection management contract between the application server and the resource adapter;
pre-populate the connection pool with an initial number of managed connection objects, wherein each said managed connection object is an application level entity that is adapted to connect an application component to the enterprise information system;
receive a request for a connection to the enterprise information system from an application component on the application server;
instantiate a resource object in the application server for accessing the enterprise information system in response to the connection request;
obtain an initiating principal associated with the application component making the connection request by querying security code of the application server;
obtain credentials from the application server for the initiating principal; and
handling the connection request to the enterprise information system with an existing managed connection object pre-populated in the connection pool after obtaining the credentials for the initiating principal;
allow the connection pool to store call stacks of where each connection is located, in order to allow a user to debug an application component that fails to close connection objects.

* * * * *

UNITED STATES PATENT AND TRADEMARK OFFICE
CERTIFICATE OF CORRECTION

| | |
|---|---|
| PATENT NO. | : 8,463,922 B2 |
| APPLICATION NO. | : 12/030660 |
| DATED | : June 11, 2013 |
| INVENTOR(S) | : June et al. |

It is certified that error appears in the above-identified patent and that said Letters Patent is hereby corrected as shown below:

On Title page, column 2, under other publications, delete "Juction"," and insert -- Junction", --, therefor.

On Title page 2, column 2, under other publications, delete "Ssytems" and insert -- Systems --, therefor.

In the Drawings:

On sheet 4 of 7, in figure 4, box 475, delete "Requst" and insert -- Request --, therefor.

In the Specifications:

Column 4, line 58, delete "then" and insert -- than --, therefor.

Column 7, line 8, delete "requests" and insert -- requests. --, therefor.

Column 9, line 1-4, delete "The invention . . . . . . . . . art." and insert the same on Col. 8, Line 67 as a continuation of the same paragraph.

Signed and Sealed this
Eighth Day of October, 2013

Teresa Stanek Rea
*Deputy Director of the United States Patent and Trademark Office*